C. G. E. MELLONIS.
TRANSMISSION MECHANISM.
APPLICATION FILED OCT. 3, 1917.
1,264,319.
Patented Apr. 30, 1918.
2 SHEETS—SHEET 1.
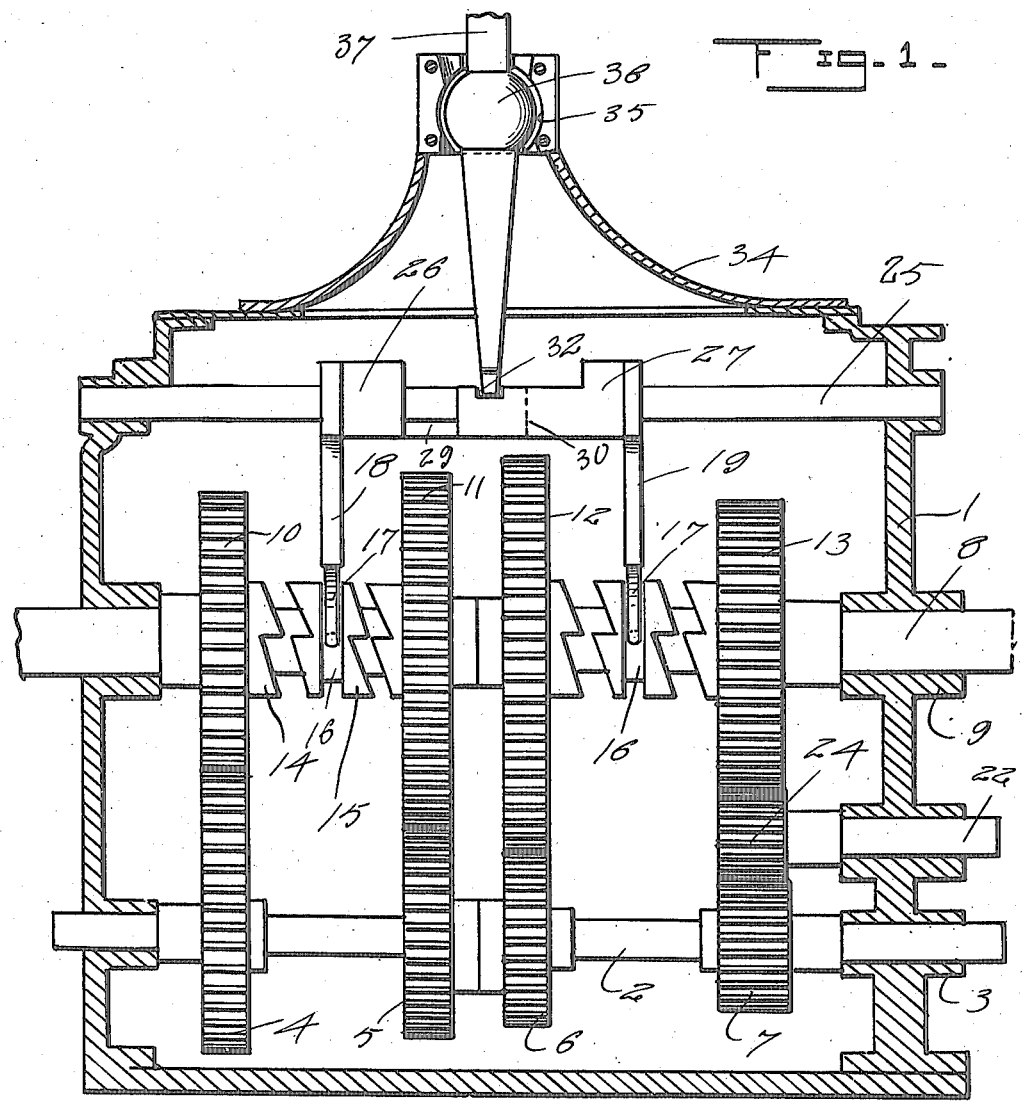
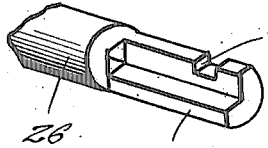
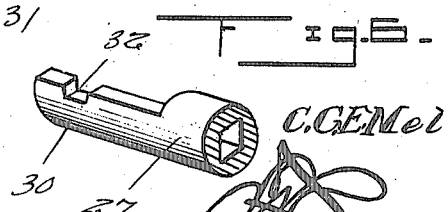
Witnesses
Inventor
C. G. E. Mellonis.

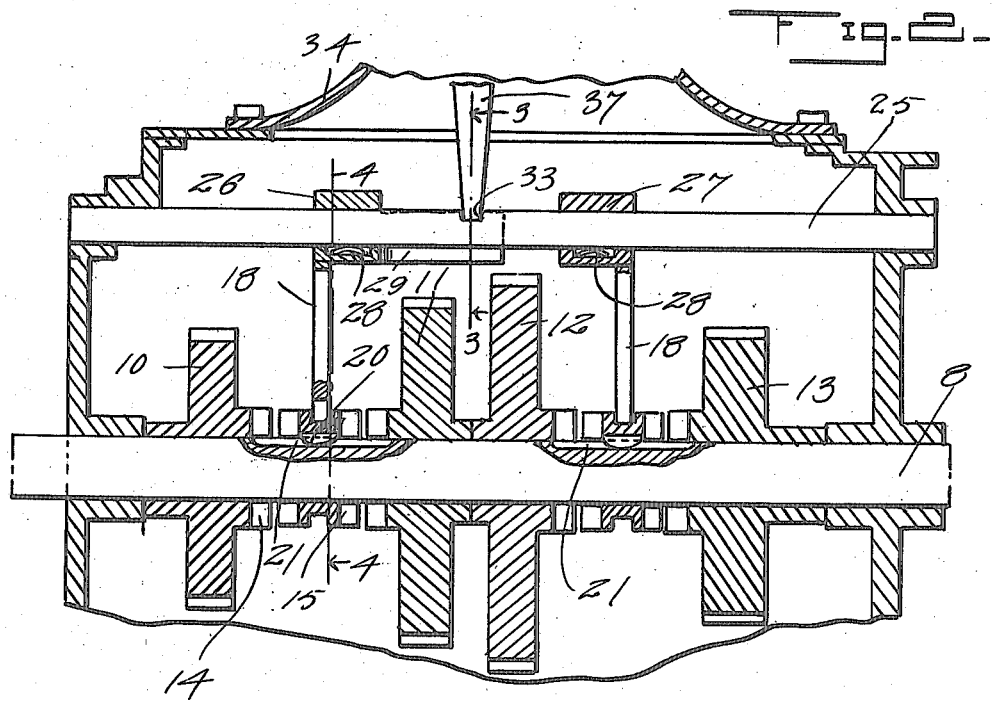
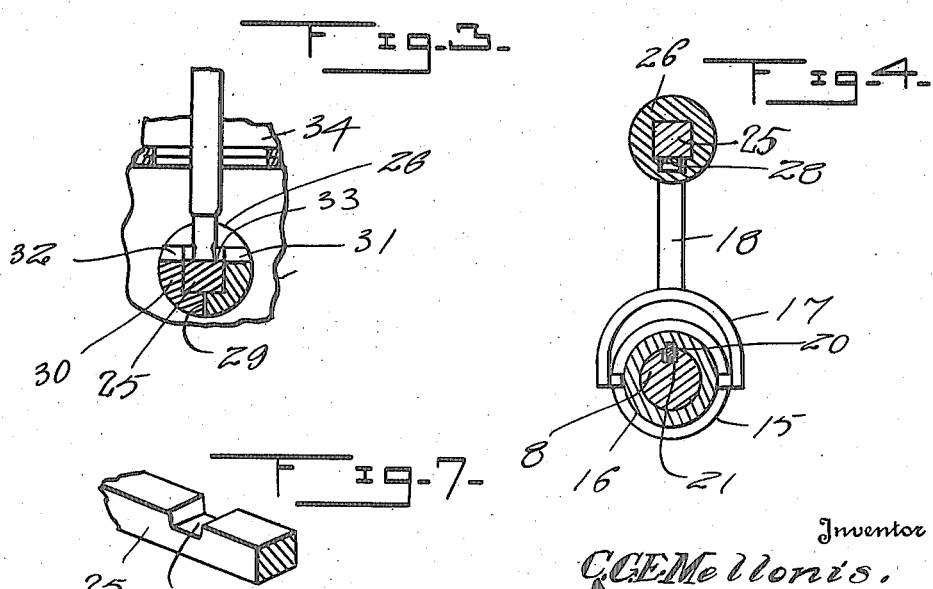

UNITED STATES PATENT OFFICE.

CONSTANTINE G. E. MELLONIS, OF BUFFALO, NEW YORK.

TRANSMISSION MECHANISM.

1,264,319.  Specification of Letters Patent.  Patented Apr. 30, 1918.

Application filed October 3, 1917. Serial No. 194,531.

*To all whom it may concern:*

Be it known that I, CONSTANTINE G. E. MELLONIS, a subject of the King of Greece, residing at Buffalo, in the county of Erie and State of New York, have invented certain new and useful Improvements in Transmission Mechanism; and I do hereby declare the following to be a full, clear, and exact description of the invention, such as will enable others skilled in the art to which it appertains to make and use the same.

This invention relates to improvements in a transmission mechanism and has for one of its objects the provision of a device of this character whereby the speed changing gears are at all times in mesh with each other, obviating undue wear thereon caused by engaging and disengaging the gears as is now customary upon transmissions to obtain the various speeds.

Another object of this invention is to provide a novel selective means for obtaining the various speeds by connecting certain gears with the drive shaft.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawings, in which—

Figure 1 is a vertical sectional view of a transmission mechanism constructed in accordance with my invention, Fig. 2 is a fragmentary vertical sectional view illustrating the selective means of connecting certain gears to the drive shaft, Fig. 3 is a transverse sectional view taken on the line 3—3 of Fig. 2, illustrating means of connecting the operating lever with the shifting sleeve, Fig. 4 is a transverse sectional view taken on the line 4—4 of Fig. 2, illustrating the means of connecting the sleeve to the dogs or clutch elements, Fig. 5 is a fragmentary perspective view of one of the sleeves, Fig. 6 is a similar view of the other sleeve, Fig. 7 is a fragmentary perspective view partly in section of the rod illustrating a notch to receive the end of the operating or shifting lever when in neutral position.

Referring in detail to the drawings, the numeral 1 indicates a transmission housing having journaled therein a drive shaft 2. One end of the drive shaft is connected in the ordinary manner to a prime mover (not shown). The drive shaft 2 is rotatably mounted within the housing 1 by suitable bearings 3 and has secured thereon gears 4, 5, 6, and 7 which vary in sizes as clearly illustrated in Fig. 1.

A driven shaft 8 is journaled in suitable bearings 9 formed in the housing 1 and is disposed over the drive shaft 2. A plurality of gears 10, 11, 12, and 13 are journaled upon the driven shaft 8 and each vary in size. The gears 4, 5, and 6, mesh with the gears 10, 11 and 12, respectively. Clutch elements 14 are formed upon the hub portions of the gears 10, 11, 12 and 13 and are arranged in pairs and disposed in the direction of each other as clearly illustrated in Fig. 1. Clutch elements 15 are splined to the driven shaft 8 between the pairs of clutch elements 14 and are provided with grooves 16 to rotatably receive forked arms 17 formed upon arms 18 and 19. The clutch elements 15 are splined to the driven shaft 8 by means of lugs 20 formed thereon and slidably received within slots 21 formed in the driven shaft 8. A stub shaft 22 is journaled in the bearing 23 carried by the housing 1 and has secured to one end thereof a gear 24 which meshes with the gears 13 and 7 for the purpose of obtaining the reverse. A rectangular rod or shaft 25 is carried by the housing 1 and disposed over the driven shaft 8 and has slidably mounted thereon sleeves 26 and 27. The sleeves 26 and 27 are each provided with a rectangular bore to conform to the shaft or rod 25 and have positioned therein leaf springs 28 that engage the shaft or rod 25 to prevent accidental movement of the sleeves 26 and 27 thereon. The sleeves 26 and 27 have formed thereon the arms 18 and 19 respectively to establish a connection between the sleeves and the clutch elements 15. Angular extensions 29 and 30 are formed upon the sleeves 26 and 27 respectively and are provided with slots or notches 31 and 32 which notches normally aline with a notch 33 in the shaft or rod 25. A supporting structure 34 is secured to the housing 1 and has formed therein a socket 35 to receive a ball or sphere 36 formed upon a controlling lever 37. The controlling lever 37 has its lower end reduced and normally disposed within the notch 33 of the shaft 25.

In operation, when it is desired to obtain reverse, the controlling lever 37 is moved laterally into the notch 32 and rearwardly causing the clutch elements 15 connected to the arm 19 to engage the clutch elements upon the gear 13. As the gear 13 is being rotated by way of the gears 24 and 7, the driven shaft 8 is then rotated in a reverse direction from the drive shaft 2. When it is desired to obtain low or first speed, the sleeve 27 is moved forwardly by the controlling lever 37 causing the clutch elements 15 upon the arm 19 to engage the clutch elements upon the gear 12. The gear 12 being driven at a slow rate of speed by the small gear 6 carried by the drive shaft 2 rotates the driven shaft 8 at a slower rate of speed than the drive shaft 2. When it is desired to obtain intermediate or second speed, the controlling lever 37 is moved laterally from the notch 33 in the rod 25 into the notch 31 of the sleeve 26. The controlling lever 37 is then moved rearwardly causing the sleeve 26 to engage the clutch elements 15 carried by the arm 18 in engagement with the clutch elements upon the gear 11. The gear 11 being driven at a faster rate of speed than the gear 12 by means of the gear 5, the driven shaft 8 is rotated at an increased speed by the drive shaft 2 than driven when in low or first speed. When it is desired to obtain third or high speed, the shifting lever 37 occupying a position in the notch 31 is moved so as to move the sleeve 26 forwardly causing the clutch elements 15 upon the arm 18 to engage the clutch elements 14 upon the gear 10. The gear 10 being driven at the same rate of speed as the drive shaft 2 by the gear 4 will cause the driven shaft 8 to rotate at the same rate of speed as the drive shaft, thus obtaining high or third speed.

While I have shown and described the preferred embodiment of my invention, it will be understood that minor changes in construction, combination and arrangement of parts may be made without departing from the spirit and scope of the invention, as claimed.

Having thus described my invention, what I claim is:

A transmission mechanism comprising a housing, a drive shaft in said housing, a driven shaft in said housing, gears secured to the drive shaft, gears journaled on the driven shaft, clutch elements carried by said second mentioned gears, clutch elements splined to the driven shaft, arms connected to said second mentioned clutch elements, a rod carried by said housing, sleeves slidable upon said rod and connected to said arms, extensions formed on said sleeves and having notches, said rod having a notch, and a controlling lever pivoted to the housing and having one end normally disposed in the notch in the rod and adapted to be moved in either of the notches of the extensions to move the sleeves in either direction.

In testimony whereof I affix my signature in presence of two witnesses.

CONSTANTINE G. E. MELLONIS.

Witnesses:
JOHN E. GAVIN,
GEORGE K. POULOS.